(12) United States Patent
Warren

(10) Patent No.: US 10,204,285 B2
(45) Date of Patent: Feb. 12, 2019

(54) APPARATUS AND METHOD FOR IDENTIFYING PLANT VARIETIES FROM LEAF SAMPLES TAKEN WHILST IN THE FIELD

(71) Applicant: AVICENNIA INVESTMENTS PTY LTD, East Ballina, NSW (AU)

(72) Inventor: James Warren, East Ballina (AU)

(73) Assignee: AVICENNIA INVESTMENTS PTY LTD, NSW (AU)

( * ) Notice: Subject to any disclaimer, the term of this patent is extended or adjusted under 35 U.S.C. 154(b) by 0 days.

(21) Appl. No.: 15/027,431

(22) PCT Filed: Sep. 11, 2014

(86) PCT No.: PCT/AU2014/000891
§ 371 (c)(1),
(2) Date: Apr. 6, 2016

(87) PCT Pub. No.: WO2015/035448
PCT Pub. Date: Mar. 19, 2015

(65) Prior Publication Data
US 2016/0239722 A1  Aug. 18, 2016

(30) Foreign Application Priority Data
Sep. 13, 2013  (AU) .............................. 2013903521

(51) Int. Cl.
| G06K 9/62 | (2006.01) |
| G06K 9/46 | (2006.01) |
| G06K 9/48 | (2006.01) |
| G06K 9/22 | (2006.01) |
| G06K 9/20 | (2006.01) |

(52) U.S. Cl.
CPC ......... *G06K 9/6215* (2013.01); *G06K 9/2027* (2013.01); *G06K 9/2036* (2013.01); *G06K 9/228* (2013.01); *G06K 9/46* (2013.01); *G06K 9/4604* (2013.01); *G06K 9/48* (2013.01); *G06K 2209/17* (2013.01)

(58) Field of Classification Search
CPC ...... G06K 9/6215; G06K 9/48; G06K 9/4604; G06K 9/228; G06K 2209/17
USPC ....................................................... 382/110
See application file for complete search history.

(56) References Cited

U.S. PATENT DOCUMENTS

| 8,189,965 B2 * | 5/2012 | Edgar | ................ G06K 9/00483 |
| | | | 382/100 |
| 8,313,031 B2 * | 11/2012 | Vinogradov | ........... G03B 13/18 |
| | | | 235/462.2 |
| 2008/0059076 A1 * | 3/2008 | Choi | .................... G06K 9/6211 |
| | | | 702/19 |

* cited by examiner

*Primary Examiner* — Amandeep Saini

(57) ABSTRACT

An apparatus for identifying plant varieties from leaf or flower samples taken while in the field comprises a scanning device having a backlight so as to enable a detailed image of a sample to be recorded digitally, a computer for uploading the image for analysis, a computer program which allocates user prescribed parameters such as leaf venation, leaf shape, base position and shape and leaf curvature to the image, and utilizing the data produced by the computer program and applying an algorithm to it for matching the data against a database of plant varieties to determine the highest match probability.

16 Claims, 8 Drawing Sheets

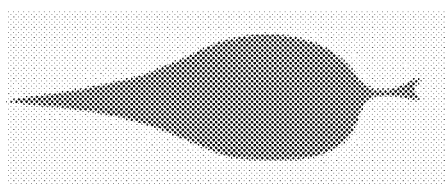
FIG. 2A
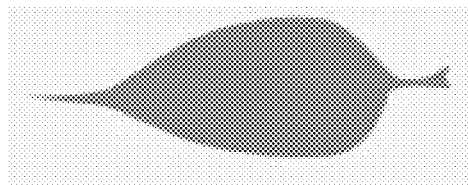
FIG. 2B
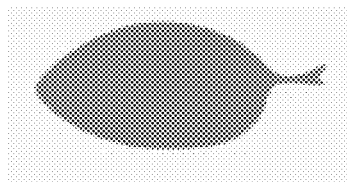
FIG. 2C
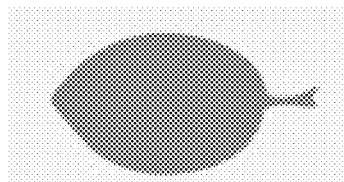
FIG. 2D
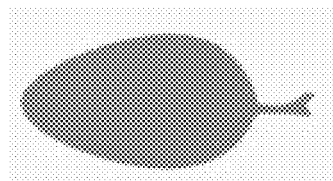
FIG. 2E
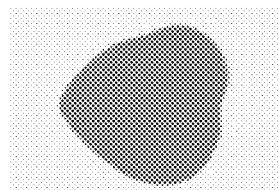
FIG. 2F
FIG. 3
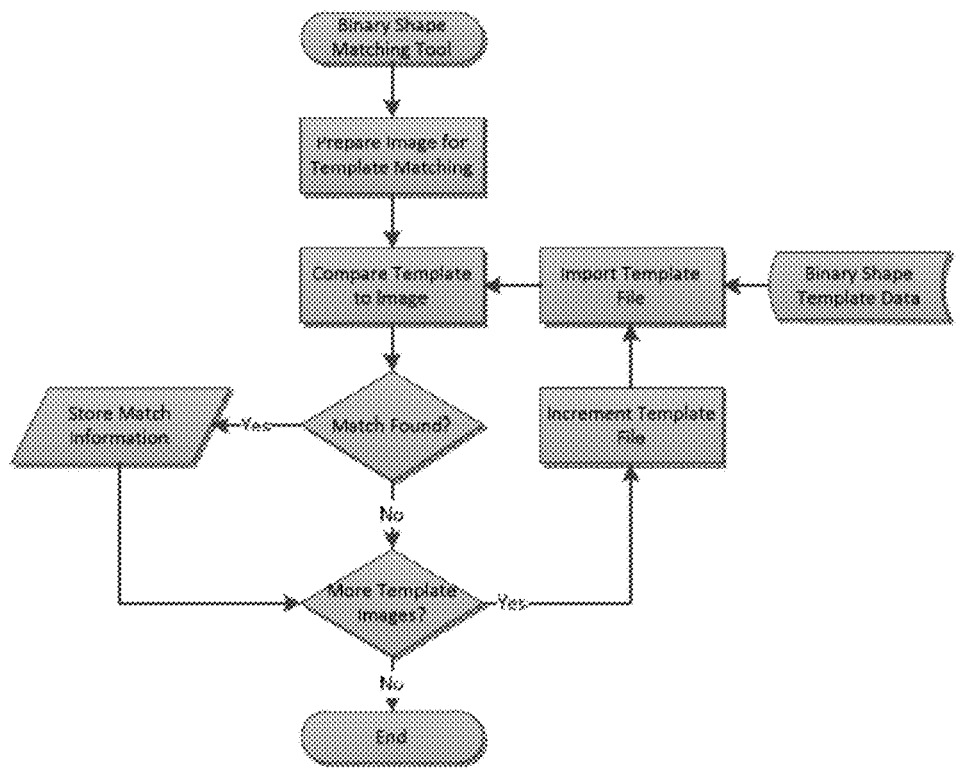

FIG. 8
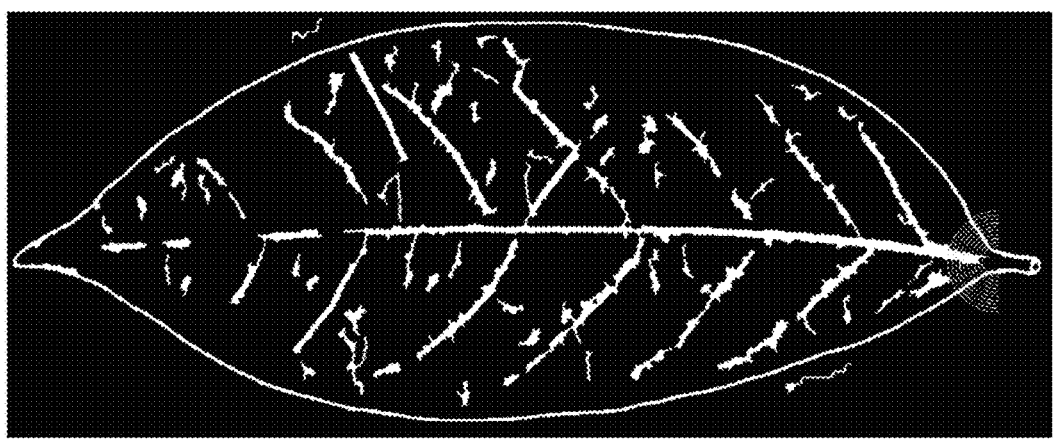
FIG. 9
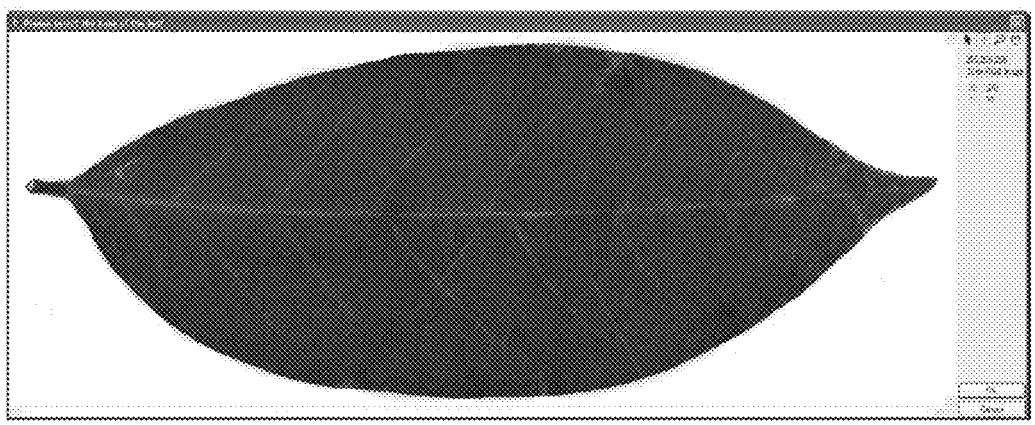
FIG. 9A
| Leaf Type | Leaf Shape | Margin | Base Veins | Base Position | Curvature |
|---|---|---|---|---|---|
| *Glochidion ferdinandi* | Aristate (97.9%) Eliptic (79.7%) Ovate (77.8%) | Smooth | 1 | Edge | Mid |
| *Macaranga tanarius* | Peltate (78.9%) Obtuse (88.9%) | Smooth | 7 | Mid | Low |
| *Mallotus philippensis* | Acuminate (83.9%) Aristate (75.1%) | Smooth | 3 | Edge | Low |

APPARATUS AND METHOD FOR IDENTIFYING PLANT VARIETIES FROM LEAF SAMPLES TAKEN WHILST IN THE FIELD

BACKGROUND

Botanists typically spend a large amount of time in the field collecting samples for their research. Historically botanists have relied upon textbooks and compendiums of plant samples to correctly identify plant varieties from leaf and flower samples. The identification of plant varieties from leaf samples is based upon a close examination of leaf venation patterns, the configuration of leaf shapes and other identifying features and matching observed but unknown features with known specimens, photographs, illustrations or descriptions.

Recent developments in computer and electronic technological fields have meant that access to digitally stored data is more readily available. Further, computer chip processing speeds and memory storage capacities have increased significantly such that it is now possible to store within a relatively small sized device a large volume of digital data or to access remotely stored data using wireless communication means. The integration of such technology with plant identification and classification algorithms is now possible and desirable as a means of facilitating the ease by which botanists might accurately identify plant samples whilst engaged in field work.

It would be advantageous to develop an apparatus and method for correctly identifying plant varieties whilst in the field based upon an examination of leaf samples which employs a suitably designed and configured electronic device. This could greatly improve the productivity of botanists engaged in field research and reduce the overall costs of undertaking such research. Such an apparatus and method may have other uses outside the field of botanical research, for example, in correctly identifying a plant type in the case of a patient experiencing an allergic reaction to a plant which may potentially be life threatening. In such circumstances the apparatus and method for identifying plant varieties may be very valuable in preserving life or in accurately diagnosing a particular medical condition and prescribing a suitable prophylaxis or remedy.

There are a number of prior art apparatuses and methods for identifying plants through leaf venation. On the "Leafsnap" website for example, there is described an application suitable for use on an i-Phone for identifying leaves which involves taking photographs of leaf samples and matching the photograph of the sample to existing photographs stored within a database. The application compares the outline of the sample leaf or flower which is not sufficiently accurate to enable correct identification of plant species to the degree required of a botanist. The application is suitable for hobbyists.

US Patent 20080059076 describes a method for classifying leaves utilizing venation features. The method includes taking a sample venation image using a Curvature Scale Space Corner Detection Algorithm. The image is then treated to thicken the venation and increase the contrast through the retrieval unit. Canny Edge Detection technology is then applied to detect the feature, branching and end points where the calculated curvature angle is a local maximum. The distribution of the feature points of the extracted venation is calculated by applying a Parzen Window non-parametric estimation method.

Existing methods of identifying plant varieties from leaf and flower samples including those referred to above however suffer from a lack of accuracy and ease of use, particularly in field situations. The method described in US 20080059076, for instance, focuses on the process of categorising leaf venation into 4 categories: pinnate, first parallel, second parallel and palmate. It assumes that the image has been captured and does not make mention as to how the exact type of leaf is determined once it has been classified into one of the four categories employed. There is a lack of cross-reference to other characteristic features of the samples examined and no overriding means of enhancing the accuracy of data captured.

The use of photographic devices to capture leaf images is known. The use of scanning devices to capture leaf images for the purpose of identification is also known known however hitherto apparatus and methods for enabling identification of plant varieties from leaf samples are inefficient and subject to a significant degree of error so as to make their use commercially unviable. Particularly, images produced by known apparatus and methods are of insufficient contrast, detail and clarity and do not produce image data which can be readily and effectively applied to assist identification of a subject plant species. It would be advantageous to provide an apparatus and method for identifying plant varieties from leaf samples which produced enhanced images for analysis in order to alleviate the large margin for error in identifying the leaf species using available apparatus and techniques. Such an apparatus and method would greatly reduce the time necessary to accurately identify a plant variety from a leaf sample, and image produced therefrom and would also significantly reduce the financial costs of providing such a service.

It would be advantageous to provide an apparatus and method for identifying plant varieties from leaf samples which overcomes at least some of the problems of prior art devices and which provided for greater accuracy in identification of samples.

Accordingly there is provided an apparatus for identifying plant varieties from leaf samples taken whilst in the field comprising:

a scanning device having an image sensor and an LED backlight so as to enable a detailed image of a sample to be recorded digitally;

a computer for uploading the image for analysis;

a computer program which allocates user prescribed parameters such as leaf venation, leaf shape, base position and shape and leaf curvature to the image;

utilising the data produced by the computer program and applying an algorithm to it for matching the data against a database of plant varieties to determine the highest match probability.

In some preferred embodiments the apparatus is a handheld or laptop computer.

There is provided a method for identifying plant varieties from leaf samples taken whilst in the field including the steps:

(i) acquiring a scanned image of a leaf sample using an apparatus comprising an LED back lit scanning device having an image sensor and an LED backlight and a computer for uploading the image for analysis;

(ii) applying an image manipulation algorithm to the scanned image to enhance venation data recorded;

(iii) producing a venation line drawing;

(iv) cross-referencing venation line drawing data with a set of identification data;

(v) comparing venation and identification data with known samples stored in a database;
(vi) choosing and displaying the most probable match for plant variety according to the sample analysis.

There is also provided a method for identifying plant varieties from leaf samples taken whilst in the field including the steps:
(i) harvesting a leaf sample;
(ii) taking a photographic image of the leaf sample using a back lit scanning device having an image sensor and an LED backlight;
(iii) extracting a set of identification parameters from the photographic image including leaf venation, leaf shape, base position and shape and leaf curvature;
(iv) applying an identification algorithm to the extracted identification parameters;
(v) presenting the results of the algorithmic analysis on a screen of a computer or hand held device;
(vi) comparing the sample with illustrations of known leaf samples;
(vii) choosing and displaying the most probable match for plant variety according to the sample analysis.

DRAWINGS

FIGS. 2A-2F show typical leaf sample shapes that may be used within the Binary Shape Matching Tool.

FIG. 3 shows the function employed in the Binary Shape Matching Tool software.

FIG. 8 shows an enhanced venation image produced using a circular edge scanning detection technique.

FIG. 9 shows the user selection window.

FIG. 9A shows the sample results after analysis using the five successive tests incorporated in the method of the present invention.

DESCRIPTION

Figure 1:
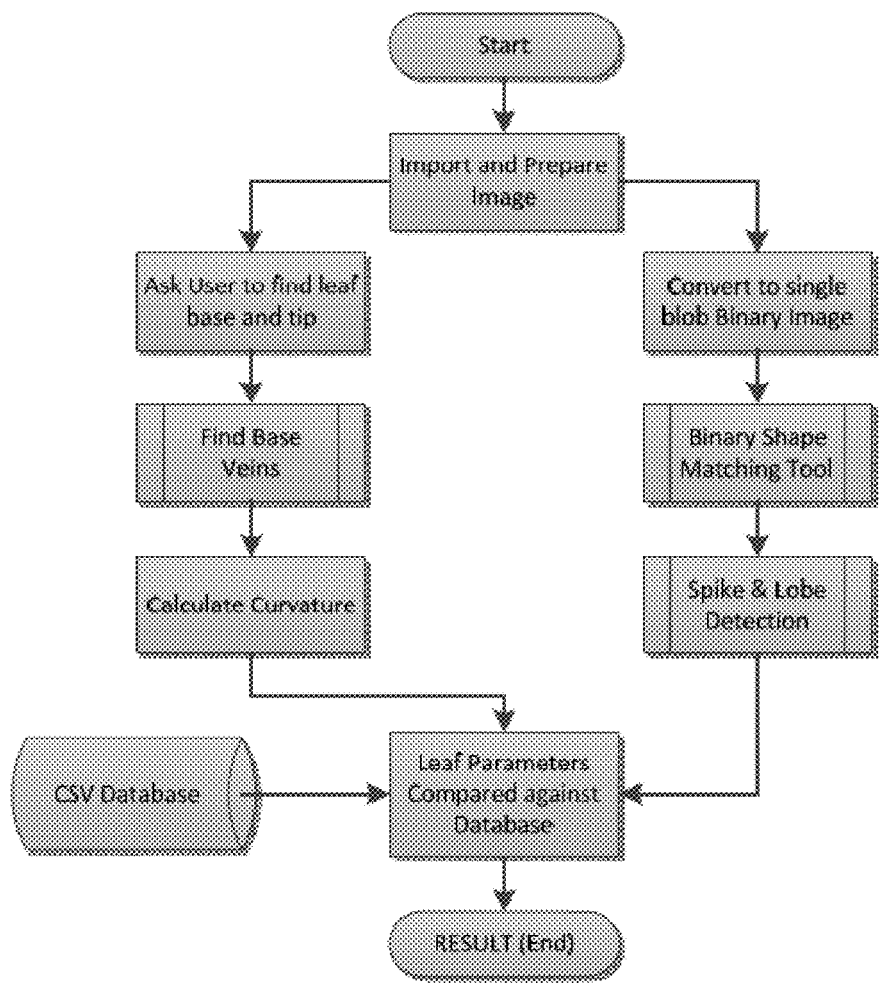
FIG. 1 shows a top-level block diagram of a preferred aspect of the pre-defined database.

The present invention is directed to providing an apparatus and method for correctly identifying plant varieties from leaf samples whilst the user is engaged in field research.

It has been found by the inventor that when botanists are using a camera, whether in the field or in the office, that they were unable to obtain a consistent environment so as to enable an accurate assessment of the venation of the sample leaves or flowers. The inability to accurately record leaf or flower characteristics, particularly venation, was as a result of limitations of lighting, distance from sample to lens and camera angle.

Similarly, when sample leaves are scanned using scanning devices that use light sources located below the sample, the inventor has found that the images produced employing such a device and methodology are of insufficient quality to enable the accurate identification of plant varieties. The use of such devices is uneconomic and prone to a large margin or error due to the lack of clarity of image produced.

It was found therefore that research conducted utilising a backlit scanner, particularly a scanner employing an image sensor and an LED light source as the backlight produced a much more consistent environment for the accurate collection of leaf and flower samples which could then be more effectively utilised to correctly identify and classify the leaf samples with respect to known plant varieties. When combined with an identification algorithm also developed by the inventor, it was found that the collected sample images could be used to identify plant varieties to an accuracy of between 90 to 95%. This represents a significant improvement in accuracy compared to existing methods of identification and classification that use photographic sample analysis.

The algorithm recognises a number of leaf characteristics including leaf shape, margin, venation and records the data as a series of parameters which are then compared to data contained within a database of line drawings of known leaf samples which may be based upon the common general knowledge in the field set out in existing reference books, for example, "Trees & Shrubs in Rainforests of New South Wales and Southern Queensland" by Gwen Harden which is relevant to the identification of plant species within that geographical region. Preferably all known reference data sources would be accessible. A standard document or image scanner may be used to record the leaf or flower sample images for analysis and identification using the "slide" feature which provides the necessary backlight required to record the sample detail sufficiently to enable analysis. It has been found that a standard scanner is suitable for use with smaller leaf and flower samples however in the case of large sample it has been necessary to construct and utilise a scanning device which has been purpose built to obtain sufficiently accurate identification and classification.

Images recorded by a backlit scanner, preferably a scanner employing an image sensor and an LED light source as the backlight, are analysed using a series of defined parameters which are cross-referenced against known plant identification parameters to identify sample plant varieties. The recorded parameters are utilised to make high-percentage estimations of identification of plant varieties derived from an algorithmic comparative analysis of the recorded data and existing identification data which may be stored remotely on a computer server located remotely from the scanner.

Various parts or sections of the tested leaf sample are analysed. Features for comparison may include, by way of non-limiting example:
leaf shape—elliptic, peltrate, etc;
margin—smooth, lobed, etc;
base veins;
base position—mid or edge;
leaf curvature—low, mid, high.

Samples may be recorded using any suitable image recording software, for example, National Instruments Image Acquisition Module (IMAQ). Recorded parameters of the sample can be compared against a pre-defined database and test result comparisons can be made to approximate the identity of the sample. An example of a pre-defined database suitable for the present purposes is National Instruments LabVIEW which utilises a visual basic programming language, although other database programming software may be suitable for use without departing from the scope of invention. FIG. 1 shows a top-level block diagram of a preferred aspect of the pre-defined database.

The database software (for example LabVIEW) includes a function called the Binary Shape Matching Tool which enables comparison of recorded shapes with a list of pre-defined binary template shapes. Only those binary shape templates that are relevant to a recorded sample are used. FIG. 2A-2F shows typical leaf sample shapes that may be used within the Binary Shape Matching Tool.

FIG. 2A-2F indicate the following leaf shapes respectively:

2A—acuminate
2B—cristate
2C—elliptic
2D—obtuse
2E—ovate
2F—peltrate

FIG. 3 shows the function employed in the Binary Shape Matching Tool software.

Figure 4:
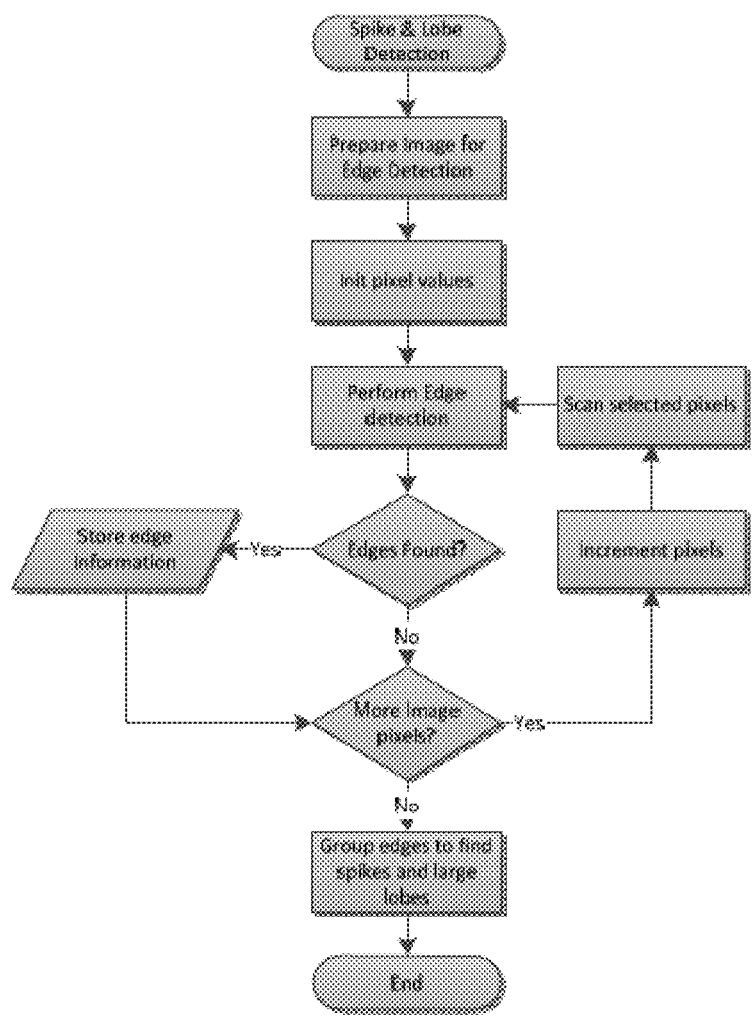
FIG. 4 shows a block diagram of the leaf margin test which identifies either spikes or lobes in the sample.

Once the Binary Shape Matching Tool has been used to approximate the shape of a leaf sample, a leaf margin test is applied to the sample. The margin test is manually programmed and utilises a sweeping line edge detector horizontally at first and then vertically to detect leaf edges. The test detects small crevices using a pre-set threshold distance between crevices, thereby identifying spikes or large crevices, thereby identifying lobes, which appear at distances larger than the pre-set threshold distance. For example, in respect of a *Glochidion ferdinandi* leaf—6 small crevice particles with an average size of 165 px; 2 large crevice particles with an average size of 121 px. Alternatively, for a leaf sample that is both spiky and lobed—99 small crevice particles with an average size of 226 px; 56 large crevice particles with an average size of 1440 px. The detected crevice spots can then be adjusted using binary morphology and manipulation according to the user's requirements. FIG. 4 shows a block diagram of the leaf margin test which identifies either spikes or lobes in the sample.

Figure 5:
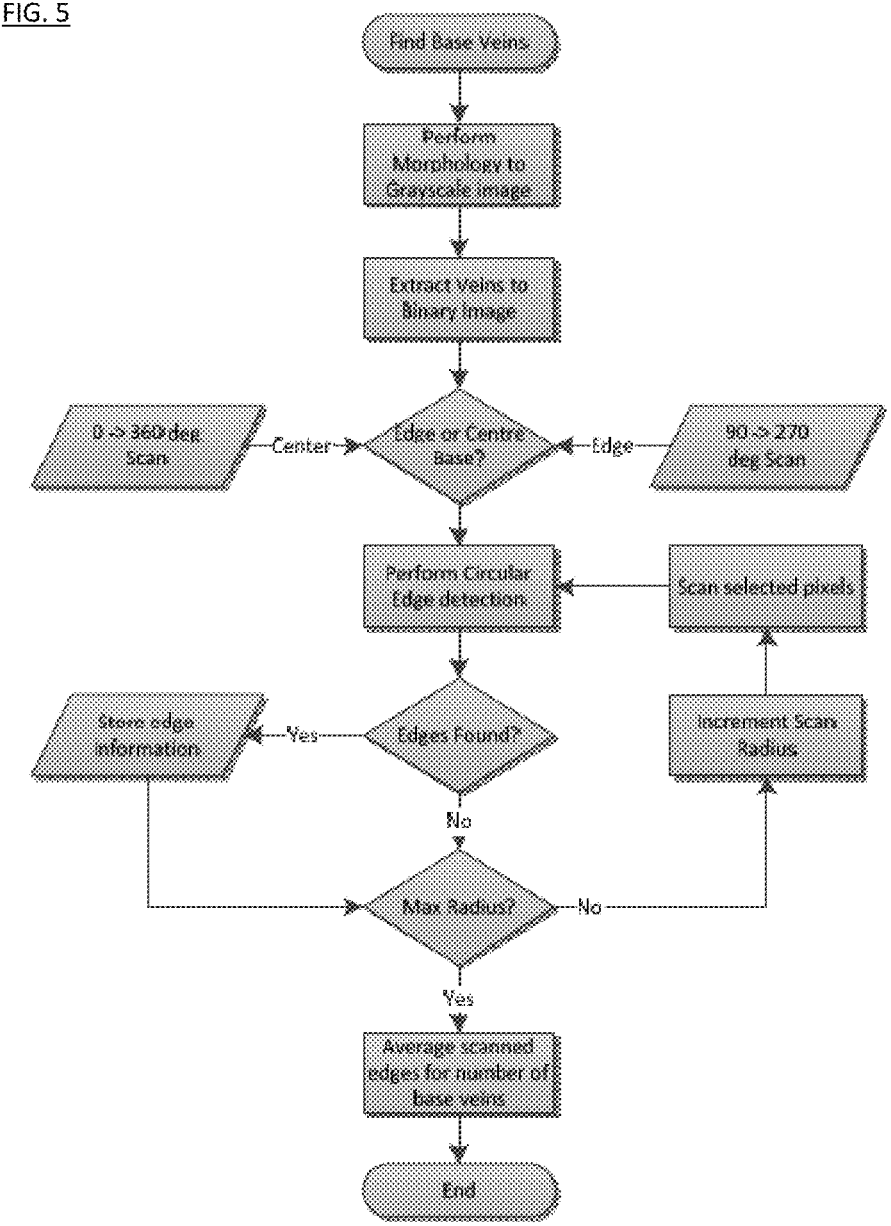
FIG. 5 shows a block diagram of the base vein testing step.

The sample data is then subjected to further testing to determine the number of veins attached to the base of the leaf sample, the site of the petiole attachment. In order to detect the number of base veins, a detailed and accurate image needs to be extracted from the original sample image. A binary image of the venation is extracted from the sample and then a circular edge detector is used to detect any attached edges or veins from the base. Recorded data is subjected to an averaging algorithm to provide a good estimation of leaf base veins. FIG. 5 provides a block diagram of the base vein testing step.

Figure 6:
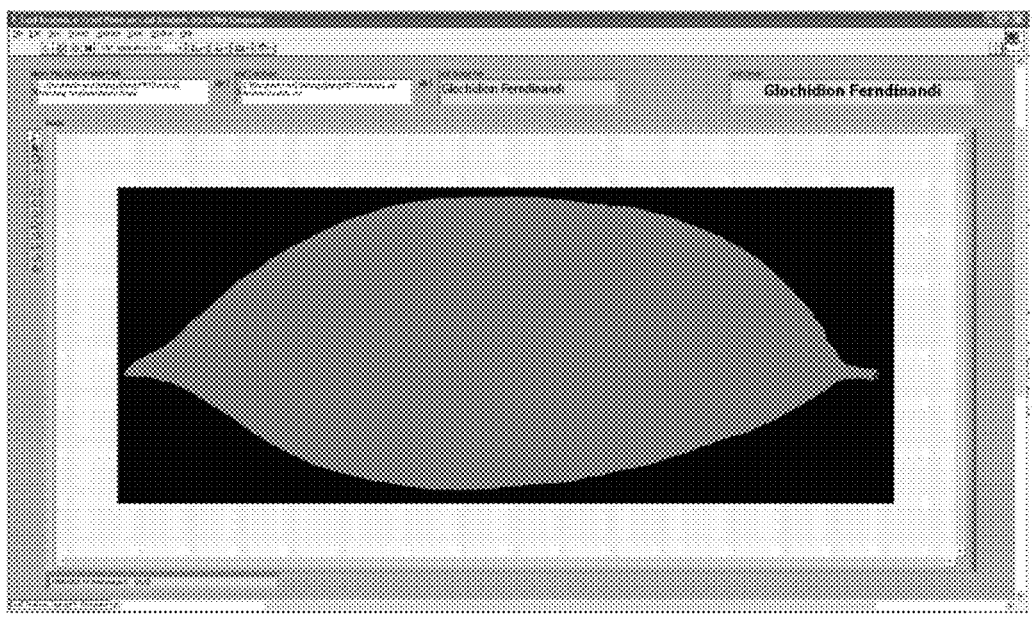
FIG. 6 shows the front screen of the software interface.

FIG. 6 shows the front screen of the software interface wherein the Binary Shape Matching Tool indicates the binary matching template path, leaf database path, image file name and the identification name of the leaf along with the binary image of the sample being processed.

Figure 7:
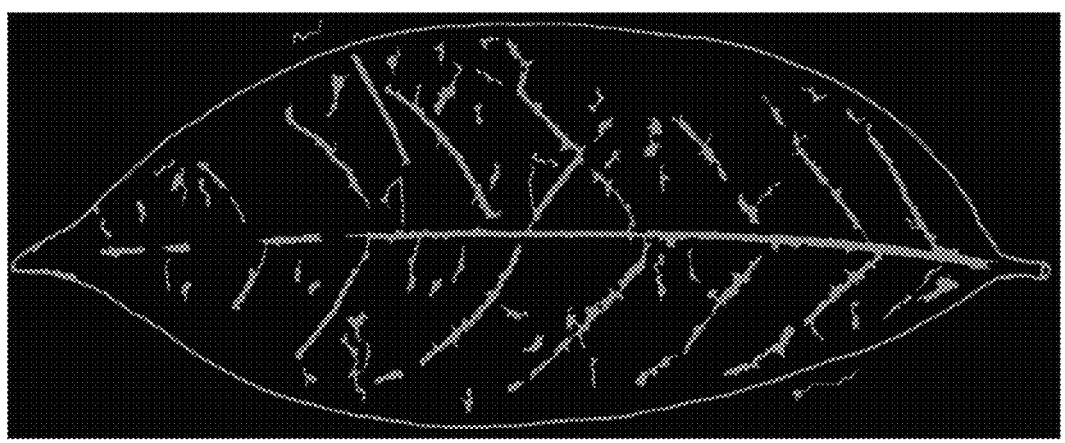
FIG. 7 shows the venation of a sample.

Using specific binary and greyscale morphology techniques a figure such as that depicted in FIG. 7 is extracted showing venation of the sample. The base of the sample is then located by user selection and translated using edge detection with a circular scanning method. FIG. 8 shows a venation image produced using a circular edge scanning detection technique.

The base and tip positions of the sample are detected by asking the user to select the points from the original binary leaf image recorded. The recorded data image is then manipulated, and rotated to align the leaves all the same. Utilising the information gained from the binary leaf image, supplied by the Binary Shape Matching test and the selected base location, the base position can easily be detected. In this first stage, the base is either positioned on the edge or the middle of the leaf sample. The user selection window is represented in FIG. 9.

The curvature of some leaves is more intense than others and can therefore be readily differentiated. The base and tip positions are found by asking the user to select them from the original leaf image sample and the chosen positions are then directly compared against the pixel location of the 'centre of mass' (CoM) of the leaf's binary image. If the difference is negligible, the curvature is very small. If the difference between the CoM and the base and tip is large, the leaf's curvature is estimated to be large also. The use of known algorithms to assist in identifying sample leaf curvature may increase accuracy of identification. Suitable algorithms may involve "Curvature Scale Space" (CSS) which can be used to find corner and interest points, edges, leaf shape, detect margins, etc. although other known algorithms may be suitable for the purpose herein envisaged.

The database used in the present invention is a comma separated vales file, however, other file types may be suitable for use without departing from the scope of invention. FIG. 9A shows the sample results after analysis using the five successive tests incorporated in the method of the present invention.

It has been found that the use of a backlit scanner has several advantages over digital still photographs, for example, a scanner provides a controlled environment with controlled white light balance. The back light may be, for example, an LED torch, however a slide scanner which activates a backlight for illuminating the veins of the sample is preferable. A backlit scanner highlights the sample venation structure which permits greater accuracy in sample identification. A scanner permits controlled measurements, size and number of pixels and there is no warping, angular or barrel distortion that is common with the use of a lens. Digital still photographic images provide neither sufficient venation detail nor constant white balance across multiple images to permit a high degree of accuracy from sample analysis. A BearPaw 2448TA Plus is a suitable backlit scanner however it suffered problems with the ability to accurately scan larger samples. Accordingly, other scanner models may also be suitable or more suitable for adaptation and use without departing from the scope of invention.

Figure 10:
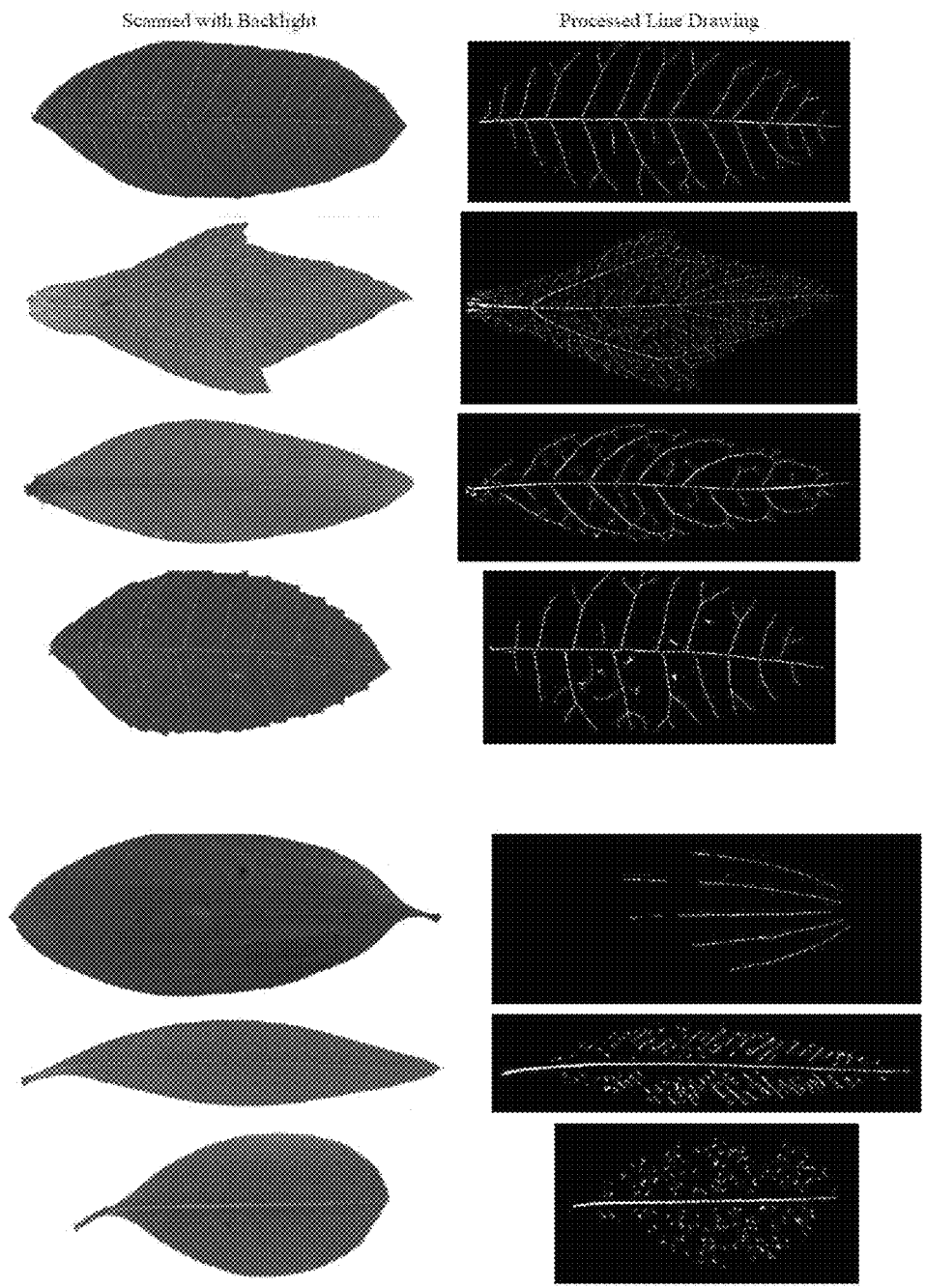
FIG. 10 shows samples taken with a backlit scanner and the resulting venation line drawings processed.
Figure 11:
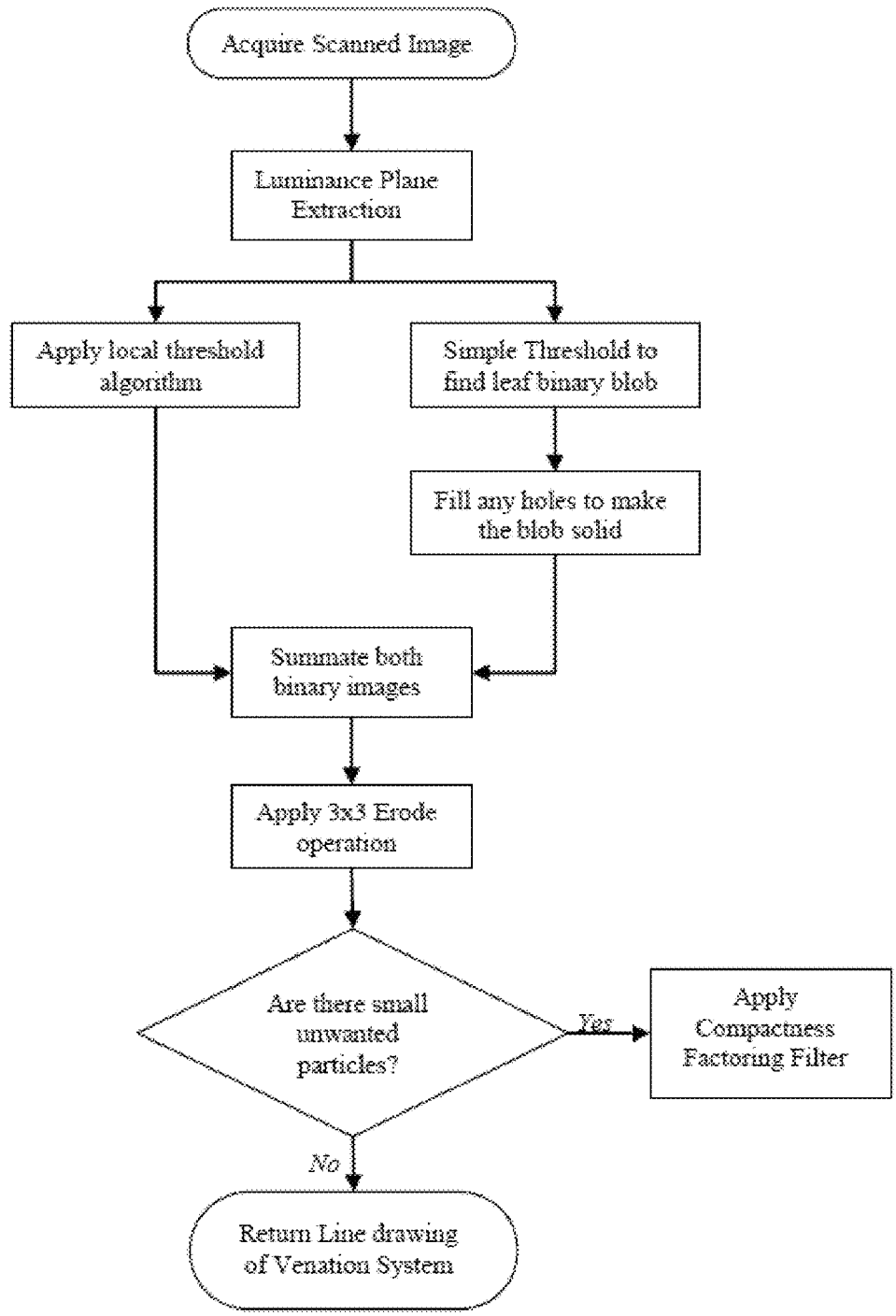
FIG. 11 shows a block diagram of the image processing steps that may be used to generate a venation line drawing.

Correct identification of venation structure is the most important aspect of the present invention. Additional parameters that may be employed in the method of the invention include testing the sample vein veins, the number of branch veins, amount of cross-venulation, identifying opposed or alternate branching, vein angles and curvature, the propensity of veins to reach the sample leaf edge and/or curve away. Improved scanning capability and image resolution allows more consistent and superior sample identification results as a result of the improved accuracy of venation pattern line drawings. FIG. 10 shows samples taken with a backlit scanner and the resulting venation line drawings processed. FIG. 11 shows a block diagram of the image processing steps that may be used to generate a venation line drawing.

The use of LED backlight in an apparatus designed specifically to capture leaf sample images using an image sensor has many advantages over existing apparatus and methods including that LED backlights are cheaper, use less power, do not heat up in use, take up a smaller space in the scanner and produce highly luminous light for a fraction of the energy consumption and associated costs than other existing solutions. As LED backlights operate at lower temperature than other backlights the risk of a sample leaf incurring heat damage is minimised. Most importantly, the incorporation of an LED backlight into a scanning device for capturing leaf samples produces a much higher quality image with a much greater degree of detail rendered than a device incorporating only an image sensor. The enhanced image produced by the apparatus and method of the present invention vastly improves the accuracy of the user in identifying the plant variety from which the leaf sample has come. The algorithm applied by the user according to the present invention when coupled with the enhanced image capture results in a much higher degree of accuracy in identification of plant varieties than other methods. This saves significant time and costs over other methods of identification which do not employ the solution disclosed by the present invention.

Those skilled in the art will appreciate that the examples provided above are not intended to be limiting and that other embodiments of the invention which fall within the scope of the disclosure herein set out are possible without departing from the scope of invention.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

What is claimed is:

1. An apparatus for identifying plant varieties from leaf or flower samples comprising:
   a portable flatbed scanning device having an image sensor and controllable backlight, to whereby the backlight provides a transmitted light through the sample that enhances the venation structure and records a digital image of the sample;
   a computer for uploading the digital image for analysis and for running a first computer program tool which contains a feature extraction algorithm for extracting leaf venation structure from the image and
   having a second computer program tool having a classification algorithm for matching an output of the feature extraction algorithm against a database of plant varieties to produce an identification of the sample and determining a highest match probability.

2. The apparatus of claim 1, wherein:
   the first computer tool, also contains a feature extraction algorithm for leaf shape.

3. The apparatus of claim 1, wherein:
   the first computer tool, also contains a feature extraction algorithm for base position and shape.

4. The apparatus of claim 1, wherein:
   the first computer tool, also contains a feature extraction algorithm for leaf curvature.

5. The apparatus of claim 1, wherein:
   the first computer tool, also contains a feature extraction algorithm for margin type.

6. The apparatus of claim 1, wherein:
   the first computer tool, also contains a feature extraction algorithm for elliptic ratio.

7. The apparatus of claim 1, wherein:
   the first computer tool, also contains a feature extraction algorithm for oil dot density.

8. The apparatus of claim 1, wherein:
   the first computer tool, also contains a feature extraction algorithm for domatia type.

9. A method for identifying plant varieties from leaf or flower samples taken whilst in an environment including steps:
   (i) acquiring a scanned image of a leaf or flower sample using an apparatus comprising a back lit scanning device having an image sensor and a backlight and a computer for uploading the image for analysis;
   (ii) applying image manipulation to the scanned image to further enhance venation and other identifying features;
   (iii) producing a digital venation line drawing from the enhanced image, that shows only the veins and other identifying features;
   (iv) extracting feature parameter data from the venation line drawing using a feature extraction algorithm
   (v) comparing feature parameter data with known samples data stored in a database;
   (vi) choosing and displaying the most probable match for the plant variety using the classification algorithm.

10. The method of claim 9, wherein:
    the first computer tool, also contains a feature extraction algorithm for leaf shape.

11. The method of claim 9, wherein:
    the first computer tool, also contains a feature extraction algorithm for base position and shape.

12. The method of claim 9, wherein:
    the first computer tool, also contains a feature extraction algorithm for leaf curvature.

13. The method of claim 9, wherein:
    the first computer tool, also contains a feature extraction algorithm for margin type.

14. The method of claim 9, wherein:
    the first computer tool, also contains a feature extraction algorithm for elliptic ratio.

15. The method of claim 9, wherein:
    the first computer tool, also contains a feature extraction algorithm for oil dot density.

16. The method of claim 9, wherein:
    the first computer tool, also contains a feature extraction algorithm for domatia type.

* * * * *